US010424154B2

(12) United States Patent
Schwartz

(10) Patent No.: US 10,424,154 B2
(45) Date of Patent: Sep. 24, 2019

(54) CONVERTING MONETARY VALUE TO PLAYER POINTS

(71) Applicant: Global Payments Gaming Services Inc., Las Vegas, NV (US)

(72) Inventor: Andrew J. Schwartz, Las Vegas, NV (US)

(73) Assignee: Global Payments Gaming Services, Inc, Las Vegas, NV (US)

(*) Notice: Subject to any disclaimer, the term of this patent is extended or adjusted under 35 U.S.C. 154(b) by 55 days.

(21) Appl. No.: 15/410,816

(22) Filed: Jan. 20, 2017

(65) Prior Publication Data

US 2017/0213418 A1 Jul. 27, 2017

Related U.S. Application Data

(60) Provisional application No. 62/281,759, filed on Jan. 22, 2016.

(51) Int. Cl.
*G07F 17/32* (2006.01)
*G06Q 20/18* (2012.01)
*G06Q 20/38* (2012.01)
*G06Q 20/04* (2012.01)
*G06Q 50/34* (2012.01)
*G07D 11/16* (2019.01)
*G07D 11/24* (2019.01)

(52) U.S. Cl.
CPC ....... *G07F 17/3244* (2013.01); *G06Q 20/045* (2013.01); *G06Q 20/18* (2013.01); *G06Q 20/381* (2013.01); *G06Q 50/34* (2013.01); *G07D 11/16* (2019.01); *G07D 11/24* (2019.01)

(58) Field of Classification Search
CPC .. G07F 17/3244; G06Q 20/045; G06Q 20/18; G06Q 50/34; G07D 11/16; G07D 11/24
USPC .......................................................... 463/25
See application file for complete search history.

(56) References Cited

U.S. PATENT DOCUMENTS

| | | | |
|---|---|---|---|
| 6,875,110 B1* | 4/2005 | Crumby | G07F 17/32 463/42 |
| 2002/0002075 A1* | 1/2002 | Rowe | G06Q 20/10 463/25 |
| 2002/0045476 A1* | 4/2002 | Poole | G07F 17/32 463/25 |
| 2006/0073883 A1* | 4/2006 | Franks, Jr. | G06Q 30/02 463/25 |

(Continued)

*Primary Examiner* — Omkar A Deodhar
*Assistant Examiner* — Wei Lee
(74) *Attorney, Agent, or Firm* — Mendelsohn Dunleavy, P.C.; Steve Mendelsohn

(57) ABSTRACT

In certain embodiments, a casino system has a server and a kiosk that receives, from a user, a voucher/player card having an associated monetary value and dispenses, to the user, a portion of the monetary value in paper currency, while the network converts the remainder of the monetary value to player points associated with the user. The kiosk may enable the user to select the portion of the monetary value to convert to player points and/or the portion of the monetary value to receive in paper currency, where the rate of converting monetary value to player points may increase as the selected portion of monetary value increases. Alternatively, the network may automatically select the portion to dispense in paper currency and the portion to convert to player points based on the smallest denomination of paper currency available to be dispensed by the kiosk.

12 Claims, 3 Drawing Sheets

(56) References Cited

U.S. PATENT DOCUMENTS

| | | |
|---|---|---|
| 2007/0181676 A1 | 8/2007 | Mateen et al. |
| 2009/0054149 A1* | 2/2009 | Brosnan .................. G07F 17/32 463/42 |
| 2009/0236201 A1* | 9/2009 | Blake ..................... G06Q 99/00 194/215 |
| 2015/0045112 A1* | 2/2015 | Donavan ............. G07F 17/3244 463/25 |

* cited by examiner

100

CONVERTING MONETARY VALUE TO PLAYER POINTS

CROSS-REFERENCE TO RELATED APPLICATIONS

This application claims the benefit of the filing date of U.S. provisional application No. 62/281,759, filed Jan. 22, 2016, the teachings of which are incorporated herein by reference in their entirety.

BACKGROUND

Field of the Invention

The present invention relates to casinos and other gaming enterprises and, more specifically but not exclusively, to kiosks for casinos.

Description of the Related Art

This section introduces aspects that may help facilitate a better understanding of the invention. Accordingly, the statements of this section are to be read in this light and are not to be understood as admissions about what is prior art or what is not prior art.

Many casinos and other gaming enterprises have electronic kiosks that enable their patrons to perform different functions, such as voucher redemption. A voucher is a piece of paper that has a monetary value associated with it. A TITO (ticket in, ticket out) ticket is a particular type of voucher. In a voucher-redemption operation, a patron cashes out by inserting a voucher into a kiosk and, in return, the kiosk dispenses cash to the patron equivalent to the monetary value associated with the voucher. The monetary value associated with a voucher may include a whole number of dollars as well as a number of cents less than a dollar. Depending on the particular implementation, a kiosk might not be able to dispense change. Such unredeemed monetary values can result in undesirable tax consequences for casinos.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
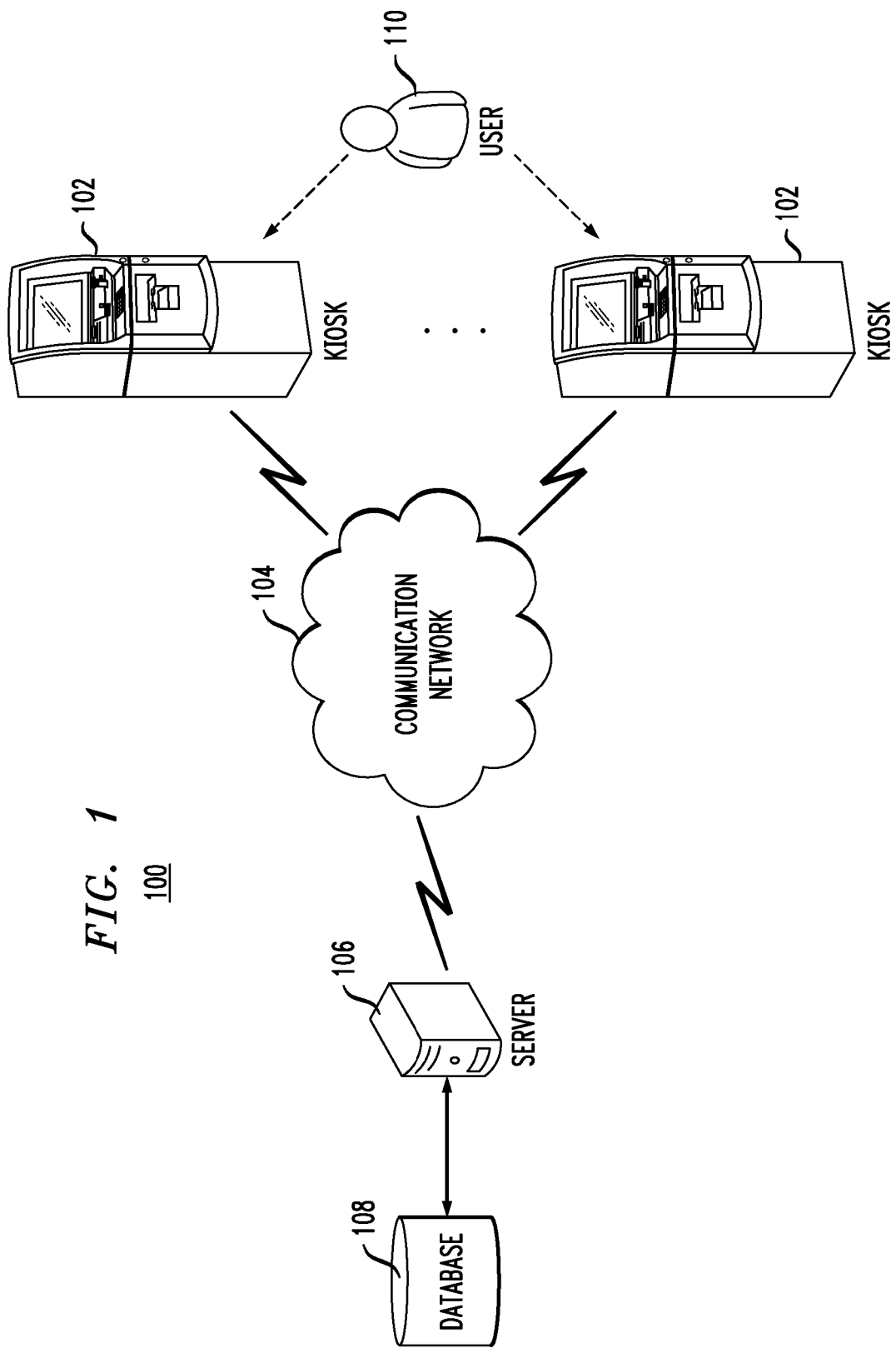
FIG. 1 is a simplified, high-level block diagram of a distributed casino system according to one possible embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to certain embodiments of the invention, a kiosk for casinos and other gaming enterprises enables patrons to convert the monetary value associated with their vouchers to player points at some specified rate of cents per point. For example, if the conversion rate is five cents for every player point, then a patron having a voucher with an associated monetary value of $52.25 can cash out by inserting the voucher into the kiosk and receiving $52 in cash. The patron can then get five player points added to his player card account for the remaining 25-cent value. Note that, if the remaining monetary value is more than 25 cents, but less than 30 cents, then the casino can round up to six player points or down to five player points or even keep track of fractional player points (i.e., a conversion rate of 0.2 player points percent, for this particular example). In this way, the kiosk does not need to be able to dispense coins, nor does the casino risk undesirable tax consequences associated with unredeemed monetary values associated with vouchers.

Although the invention is described in the context of the redemption of monetary value associated with vouchers, in general, the invention can be implemented in the context of the redemption of monetary values associated with any suitable vouchers and/or player cards.

In some implementations, a kiosk might not support certain denominations of cash. For example, a kiosk might be able to dispense $100s, $20s, and $10s, but not $5s and $1s. In that case, depending on the implementation, the kiosk can give the patron the option of converting or even require the patron to convert any remaining monetary value associated with a voucher of less than $10 into player points.

In another implementation, the kiosk can give the patron the option of converting some or even all of the monetary value associated with his voucher into player points instead of getting the entire integer dollar amount in cash. For example, if a voucher has an associated monetary value of $80, and the kiosk can dispense $10 bills, then the kiosk can give the patron the option of receiving from zero to eight $10 bills and having the remaining monetary value (if any) converted to player points. For example, the patron may choose to receive $50 in cash and have the remaining $30 converted to player points.

As used herein, the term "player points" refers to credits associated with a particular patron of a gaming enterprise. As used herein, the term "gaming enterprise" may refer to a single gaming location, such as an individual casino, or a number of different, affiliated gaming locations, such as a plurality of casinos owned or operated by the same company. When a gaming enterprise has multiple gaming locations, a patron's gaming points can be accrued and applied in any of the different gaming locations of that gaming enterprise. Depending on the particular implementation, player points may be accrued by patrons based on, for example, the amount and/or type of gaming activities in which the patron participates as well as by converting the monetary value of vouchers/player cards, as in the present invention, and patrons may apply their accumulated player points to "pay for" certain amenities at the gaming enterprise, such as food, entertainment, parking, and lodging. Such a patron may be issued a physical "player card" having printed and/or stored information that identifies the patron. In addition, each such patron will have a "player account" with the gaming enterprise that is used to maintain information about the patron, including the current number of player points associated with the patron.

FIG. 1 is a simplified, high-level block diagram of a distributed casino system 100 according to one possible embodiment of the invention. As shown in FIG. 1, the casino system 100 has a plurality of kiosks 102 that are configured to communicate via a suitable communication network 104 with a server 106 that accesses a database 108 storing information about patrons' player accounts. The casino system 100 enables patrons, like user 110, to operate the kiosks 102 to perform kiosk functions, such as voucher-redemption operations.

The communication network 104 may include a local area network (LAN), a wide area network (WAN), and/or a global area network (GAN). The communication network 104 may provide for wireline, wireless, or a combination of wireline and wireless communication between devices in the network. The server 106 is any suitable processor-based computer node or sub-system, and database 108 is stored in any suitable computer memory device accessible by the server 106.

Figure 2:
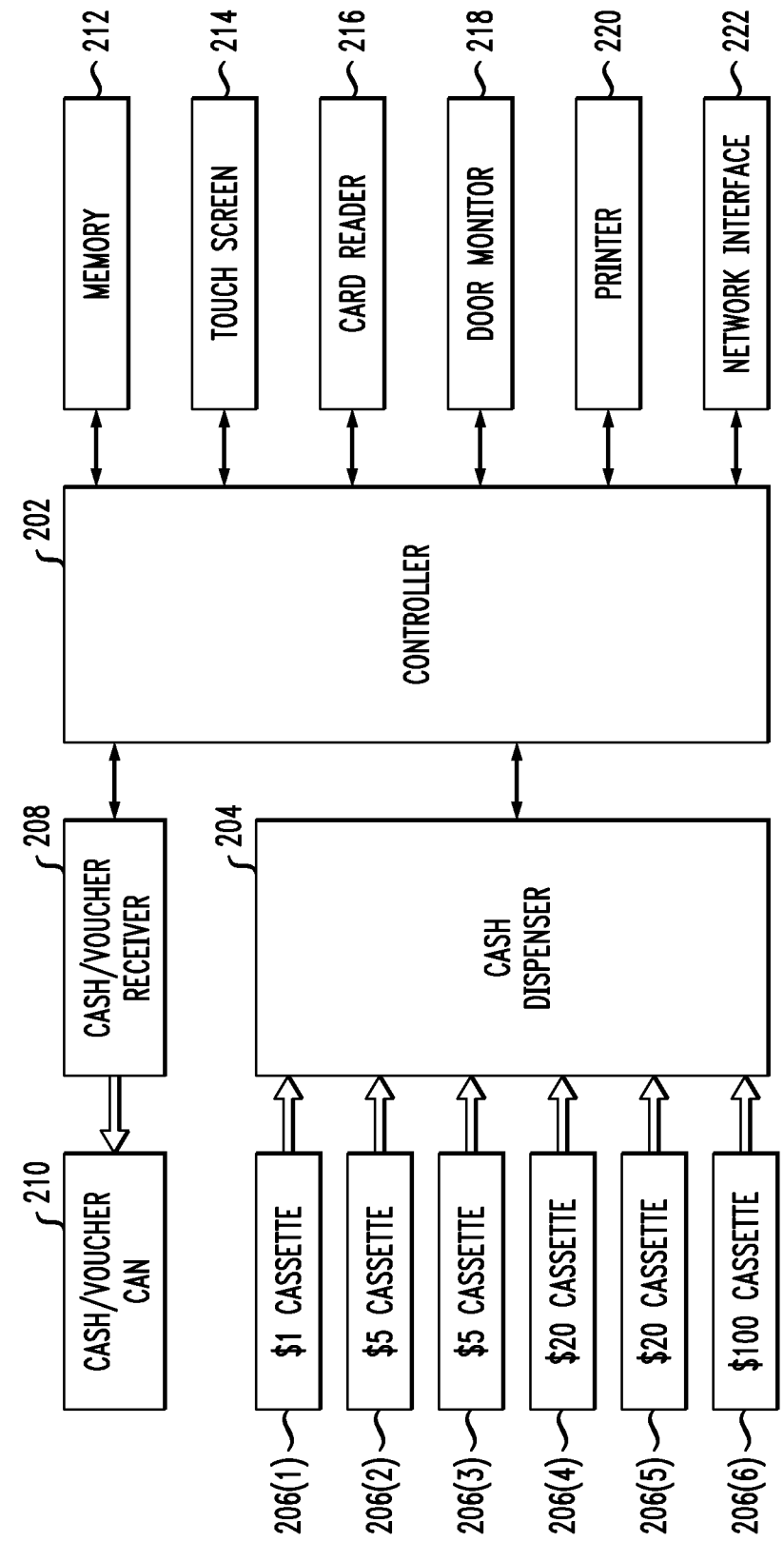
FIG. 2 is a simplified, high-level block diagram of a kiosk that may be used to implement any of the kiosks of FIG. 1, according to one embodiment of the invention.

FIG. 2 is a simplified, high-level block diagram of a kiosk 200 that may be used to implement any of the kiosks 102 of FIG. 1, according to one embodiment of the invention. As shown in FIG. 2, kiosk 200 has six cash cassettes: one $1 cassette 206(1), two $5 cassettes 206(2) and 206(3), two $20 cassettes 206(4) and 206(5), and one $100 cassette 206(6). Other implementations of kiosks 102 of FIG. 1 may have different numbers of cash cassettes provisioned for different denominations of paper currency. In addition, kiosk 200 has the following elements configured to perform the following functions that support user operation of kiosk 200:

Controller 202 configured to control all of the automated operations of kiosk 200;
Cash dispenser 204 configured to retrieve bills from the appropriate cash cassettes 206 and present the retrieved bills to the user;
Cash/voucher receiver 208 configured to receive and retrieve information from and/or about paper currency and vouchers inserted by the user and store them in the cash/voucher can 210;
Memory 212 configured to store software programs and data for the controller 202;
Touch screen 214 configured to display textual and graphical information to the user and to receive manual data inputs from the user;
Card reader 216 configured to receive and read the user's player card, credit/debit card, or identification card;
Door monitor 218 configured to detect and record access to the can 210 and the cash cassettes 206;
Printer 220 configured to print receipts and vouchers for the user; and
Network interface 222 configured to enable the controller 202 to communicate with the casino-system server 106 of FIG. 1 via communication network 104.

In certain embodiments, the cash dispenser 204 may be either a present-type cash dispenser that collects all of the bills from the appropriate cash cassettes 206 and presents them to the user as a single stack of bills or a dispense-type cash dispenser that sequentially retrieves from an appropriate cash cassette 206 and presents to the user one bill at a time.

Kiosk 200 is configured to support the normal range of functions provided to patrons of casinos or other gaming enterprises. In addition, kiosk 200 is configured to support the voucher-redemption operations of this invention.

Figure 3:
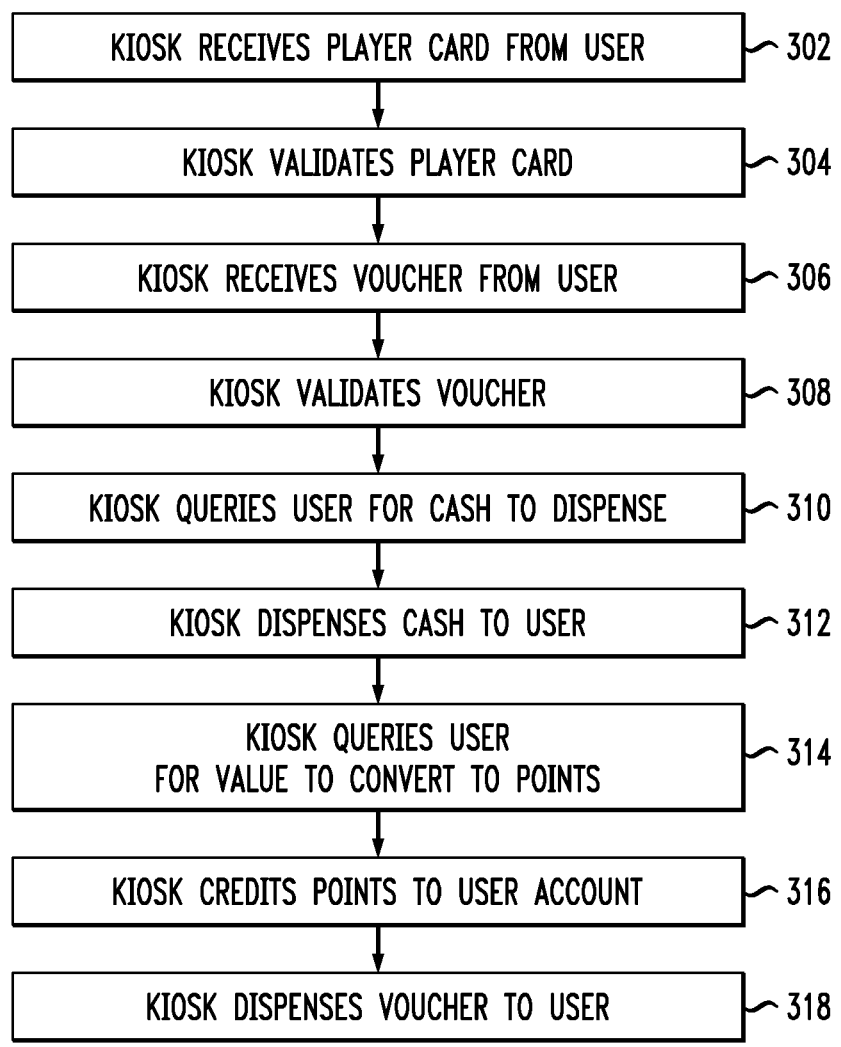
FIG. 3 is a flow diagram of processing implemented by the casino system of FIG. 1 during an access event in which the user uses one of the kiosks to perform a voucher-redemption operation, according to one possible embodiment of the invention.

FIG. 3 is a flow diagram of processing implemented by the casino system 100 of FIG. 1 during an access event in which the user 110 uses one of the kiosks 102 to perform a voucher-redemption operation, according to one possible embodiment of the invention. The processing begins in step 302 with the user 110 inserting his player card into the kiosk 102, which reads identification information stored on the player card that uniquely identifies the user 110.

In step 304, the kiosk 102 validates the user's player card. In particular, the kiosk 102 transmits the user identification information to the server 106 via the communication network 104. The server 106 uses the received user identification information to access the user's player account stored in the database 108 to determine whether the player card is valid and the player account is active and informs the kiosk 102 of that determination via the communication network 104.

Assuming that the player card is valid and the player account is active, processing continues to step 306, where the user 110 inserts a voucher to be redeemed into the kiosk 102. In step 308, the kiosk 102 validates the voucher. In some implementations, the monetary value of the voucher is stored and/or printed on the voucher itself. In those implementations, the kiosk 102 may be able to determine the monetary value of the voucher without needing to communicate with the server 106.

In other implementations, the voucher has identification information that uniquely identifies the voucher, but not the monetary value associated with the voucher, which monetary value is stored in the system's database 108. In those implementations, the kiosk 102 reads and transmits the identification information from the voucher to the server 106 via the communication network 104, and the server 106 uses that identification information to access the database 108 to determine and transmit the monetary value of the voucher back to the kiosk 102 via the communication network 104.

Assuming that the voucher has non-zero monetary value and assuming that that monetary value is larger than the smallest-denomination currency contained in the kiosk's cash cassettes, processing continues to step 310, where the kiosk 102 queries the user 110 for an amount of cash to dispense, and the user 110 uses the kiosk's data input device (e.g., touch screen or key pad) to enter the requested amount of cash. In step 312, the kiosk 102 dispenses the requested amount of cash to the user and then, depending on the particular implementation, debits the monetary value of the voucher by the monetary value of the dispensed cash or transmits information to the server 106 about the monetary value of the dispensed cash so that the server 106 can update the corresponding monetary value in the database 108.

Assuming that the voucher has some remaining monetary value, processing continues to step 314, where the kiosk 102 queries the user for an amount of monetary value to convert to player points to be added to the user's player account, and the user 110 uses the kiosk's data input device to enter a requested amount of monetary value to convert that is any amount up to the remaining monetary value.

In step 316, the kiosk 102 causes the requested amount of monetary value to be converted into player points assigned to the user. In particular, the kiosk 102 transmits information about the requested monetary value to the server 106 via the communication network 104, and the server 106 converts the requested monetary value into player points and updates the user's player account in the database 108. Depending on the particular implementation, the kiosk 102 or the server 106 updates the remaining monetary value, if any, associated with the voucher.

If there is any remaining monetary value, then, in step 316, the kiosk 102 outputs a new voucher to the user with that remaining monetary value associated with it.

Although FIG. 3 depicts the querying and dispensing of cash of steps 310 and 312 occurring before the querying and conversion to points of steps 314 and 316, in other implementations, point conversion may occur before cash dispensing.

Note that, in some other implementations, the user is given little or no choice in a voucher-redemption operation. In one possible implementation, after step 312, the kiosk 102 (possibly in combination with the server 106) automatically converts any remaining monetary value into player points, such that steps 314 and 318 of FIG. 3 are omitted. In another possible implementation, after step 308, the kiosk 102 (possibly in combination with the server 106) automatically determines how much cash to dispense based on the denominations of paper currency available in the kiosk's cash cassettes (e.g., to maximize the monetary value of the dispensed cash) and automatically converts any remaining monetary value into player points, such that steps 310, 314, and 318 of FIG. 3 are omitted.

Although embodiment of FIG. 3 involves the user 110 inserting both a player card and a voucher in the kiosk 102, in some other embodiments, the user 110 inserts only a player card, and steps 306 and 308 are omitted. In these embodiments, the monetary value available to be redeemed is directly associated with the player card itself. Depending on the particular implementation, either the player card itself contains information about the monetary value or that information is retrieved by the kiosk 102 from the server 106 via the communication network 104.

Although the invention has been described in the context of an implementation in which monetary value is converted into player points at a fixed rate, in other implementations, the conversion rate may vary with the size of the monetary value. For example, to incentivize patrons to convert monetary value into player points, the kiosk may be configured to provide a higher conversion rate (i.e., more player points per dollar) for greater monetary values.

In certain embodiments, the invention is a system and a method implemented by a system comprising a server and a kiosk configured to communicate with the server over a communication network of the system. The kiosk receives, from a user, a voucher/player card having an associated monetary value, and the system determines the monetary value associated with the voucher/player card and converts a first portion of the monetary value to player points associated with the user.

In certain embodiments, the kiosk dispenses, to the user, a second portion of the monetary value in paper currency.

In certain embodiments, there is a non-zero remaining monetary value after the system converts the first portion of the monetary value and after the kiosk dispenses the second portion of the monetary value, and the kiosk outputs, to the user, another voucher having the non-zero remaining monetary value.

In certain embodiments, the kiosk enables the user to select the second portion of the monetary value to receive in paper currency.

In certain embodiments, the system automatically selects the second portion of the monetary value to dispense in paper currency based on a smallest denomination of paper currency available to be dispensed by the kiosk.

In certain embodiments, the system applies a larger rate of converting monetary value to player points for larger magnitudes of the first portion of the monetary value.

In certain embodiments, the kiosk enables the user to select the first portion of the monetary value to convert to the player points.

In certain embodiments, the system automatically selects the first portion of the monetary value to convert to player points based on a smallest denomination of paper currency available to be dispensed by the kiosk.

In certain embodiments, the system enables the first portion of the monetary value converted to the player points to comprise a fraction of a smallest denomination of paper currency available to be dispensed by the kiosk.

In certain embodiments, the system enables the first portion of the monetary value converted to the player points to comprise a fraction of a U.S. dollar.

In certain embodiments, the system enables the first portion of the monetary value converted to the player points to further comprise an integer number of the smallest denomination of the paper currency available to be dispensed by the kiosk.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. In a gaming system of a gaming enterprise, the gaming system comprising gaming machines and a non-gaming kiosk, a method comprising:
   (a) the gaming system identifying a user's player account associated with a voucher/player card having an associated monetary value;
   (b) the gaming system determining the monetary value associated with the voucher/player card;
   (c) the non-gaming kiosk receiving, from the user, a request to redeem the voucher/player card;
   (d) the gaming system automatically converting a first portion of the monetary value to non-gaming player points associated with the user's player account and useable by the user to pay for non-gaming amenities at the gaming enterprise, wherein the first portion of the monetary value converted to the non-gaming player points comprises a fraction of a smallest denomination of paper currency available to be physically dispensed by the non-gaming kiosk; and
   (e) the non-gaming kiosk automatically physically dispensing, to the user, a second portion of the monetary value in paper currency, wherein the gaming system automatically selects non-zero values for the first and second portions of the monetary value based on a smallest denomination of paper currency available to be physically dispensed by the non-gaming kiosk, such that no monetary value associated with the voucher/player card is left unredeemed.

2. The method of claim 1, wherein the first portion of the monetary value converted to the non-gaming player points comprises a fraction of a U.S. dollar.

3. The method of claim 1, wherein the first portion of the monetary value converted to the non-gaming player points further comprises an integer number of the smallest denomination of the paper currency available to be physically dispensed by the non-gaming kiosk.

4. A gaming system of a gaming enterprise, the gaming system comprising:
   a server;
   gaming machines configured to communicate with the server over a communication network of the gaming system; and
   a non-gaming kiosk configured to communicate with the server over the communication network of the gaming system, wherein:
      the gaming system is configured to identify a user's player account associated with a voucher/player card having an associated monetary value;
      the gaming system is configured to determine the monetary value associated with the voucher/player card;
      the non-gaming kiosk is configured to receive, from the user, a request to redeem the voucher/player card;
      the gaming system is configured to automatically convert a first portion of the monetary value to non-gaming player points associated with the user's player account and useable by the user to pay for non-gaming amenities at the gaming enterprise, wherein the gaming system is configured to enable the first portion of the monetary value converted to the non-gaming player points to comprise a fraction of a smallest denomination of paper currency available to be physically dispensed by the non-gaming kiosk; and
      the non-gaming kiosk is configured to automatically physically dispense, to the user, a second portion of the monetary value in paper currency, wherein the gaming system automatically selects non-zero values for the first and second portions of the monetary value based on a smallest denomination of paper currency available to be physically dispensed by the non-gaming kiosk, such that no monetary value of the voucher/player card is left unredeemed.

5. The gaming system of claim 4, wherein the gaming system is configured to enable the first portion of the monetary value converted to the non-gaming player points to comprise a fraction of a U.S. dollar.

6. The gaming system of claim 4, wherein the gaming system is configured to enable the first portion of the monetary value converted to the non-gaming player points to further comprise an integer number of the smallest denomination of the paper currency available to be physically dispensed by the non-gaming kiosk.

7. The non-gaming kiosk of claim 4.

8. The server of claim 4.

9. The gaming system of claim 4, wherein the non-gaming player points can be used to pay for one or more of food, entertainment, parking, and lodging.

10. The method of claim 1, wherein the non-gaming player points can be used to pay for one or more of food, entertainment, parking, and lodging.

11. The method of claim 1, wherein step (a) comprises the non-gaming kiosk physically receiving the voucher/player card.

12. The gaming system of claim 4, wherein the non-gaming kiosk physically receives the voucher/player card.

\* \* \* \* \*